UNITED STATES PATENT OFFICE 2,597,202

SOLUBLE INTERPOLYMERS OF A POLY-2-ALKENYL ESTER, VINYLIDENE CHLORIDE, AND A MONOUNSATURATED 2-ALKENYL COMPOUND

Pliny O. Tawney, Passaic, N. J., assignor to United States Rubber Company, New York, N. Y., a corporation of New Jersey No Drawing. Application September 4, 1948, Serial No. 47,951

2 Claims. (Cl. 260—78.5)

My invention relates to a new class of soluble, unsaturated resins which can be readily converted to insoluble, heat-resistant products by further polymerization and to a method of preparing same. More specifically, my invention concerns the preparation of new, soluble, convertible resins from mixtures of poly-2-alkenyl esters of polybasic acids with copolymerizable monoolefinic compounds, by conjoint interpolymerization of these monomers with a third monomer which is a different, monounsaturated 2-alkenyl compound selected from the class of 2-alkenyl alcohols, 2-alkenyl chloride, 2-alkenyl monoethers of non-enic alcohols, and 2-alkenyl monoesters of non-enic carboxylic acids. This application is a continuation-in-part of my copending application Serial No. 646,219 filed February 7, 1946, and now abandoned.

Prior to the present invention, the copolymerization of poly-2-alkenyl esters such as diallyl fumarate with copolymerizable monoolefinic compounds, e. g., methyl acrylate or diethyl fumarate, was known to yield insoluble gels before more than a minor proportion of the monomeric reactants had been converted to the polymeric form. The resulting intractable, heterogeneous mixtures of insoluble gel, low molecular weight copolymers and unreacted monomers are not only difficult to manipulate, but are of little or no commercial utility, since many industrial processes, e. g., coating, laminating and molding, require or prefer a uniform and initially soluble, fusible resin which, after application, can be "cured" or polymerized to a solvent- and heat-resistant state. Soluble, unsaturated resins can be obtained, albeit in very low yields, by halting the copolymerization prior to gelation, but the resulting products must undergo extensive purification to remove the large amounts of unreacted starting materials present and the latter themselves must be isolated, purified and recycled for use in subsequent copolymerization. It has been proposed to ameliorate the unfavorable economic aspects of such a process by increasing the yield of soluble copolymer prior to gelation. However, the suggested methods such as the use of high reaction temperatures and/or large amounts of diluents, catalysts, inhibitors, etc., actually effect only disproportionately small or insignificant increases in the yield of soluble copolymer. Moreover, the products must undergo elaborate and expensive refining operations to remove diluents, inhibitors, catalyst fragments, etc., in order to retain the desirable properties, e. g., optical clarity and thermal stability of the resins.

These prior art difficulties have now been successfully overcome by my invention, for I have discovered that by interpolymerizing a mixture of (A) a monomeric poly-2-alkenyl ester, (B) a copolymerizable, monoolefinic compound, and (C) a different, mono-unsaturated 2-alkenyl compound of the class defined above, the major proportion of both the first-named and the second-named monomeric materials can be converted to the soluble, interpolymeric form without danger of gelation. In further contrast to the prior art, my reaction proceeds readily at moderate temperatures, and in the absence of the special conditions and precautions heretofore employed in attempts to delay or avert gelation. Moreover, since my novel products are uniform and more homogeneous in character, they require little or none of the expensive purification operations heretofore employed.

The interpolymerizable 2-alkenyl compounds (C) which are useful in my invention can be represented by the generic formula

$$XCH=CX-CH_2X'$$

where one X is hydrogen and the other X is one of the radicals hydrogen, chlorine, methyl, ethyl, chloromethyl, and phenyl, and X′ is one of the radicals chlorine, hydroxyl, alkoxy (e. g., methoxy, ethoxy, beta-hydroxyethoxy, propoxy, isopropoxy, n-butoxy, isobutoxy, amyloxy, hexoxy, heptoxy, octoxy, nonoxy, decoxy), aryloxy (e. g., phenoxy and tolyloxy), aralkoxy (e. g., benzyloxy), and acyloxy (e. g., acetoxy, propionoxy, isobutyroxy, valeroxy, benzoyloxy). Illustrative of such compounds are allyl chloride, methallyl chloride, crotyl chloride, 2,3-dichloropropene, 1,4-dichlorobutene - 2,2 - (chloromethyl)allyl chloride, allyl alcohol, methallyl alcohol, 2-chloroallyl alcohol, crotyl alcohol, cinnamyl alcohol, 2-ethylallyl alcohol, allyl methyl ether, methallyl ethyl ether, beta-allyl-oxyethanol, allyl propyl ether, methallyl butyl ether, methallyl amyl ether, methallyl heptyl ether, allyl octyl ether, crotyl ethyl ether, 2-chloroallyl ethyl ether, methallyl phenyl ether, allyl benzyl ether, allyl acetate, 2-chloroallyl propionate, methallyl butyrate, ethallyl valerate and cinnamyl acetate. Those compounds in which the terminal X is hydrogen are preferred.

Among such mono-unsaturated compounds, I have found the 2-alkenyl alcohols and the 2-alkenyl chlorides to be the most effective in repressing gelation of the polymerizing mixtures of the poly-2-alkenyl ester and the copolymerizable monoolefinic compound. Those interpolymers embodying the 2-alkenyl chlorides are particularly useful where products of decreased flammability are desired, although such materials are somewhat inferior to the interpolymers of the 2-alkenyl alcohols, ethers and carboxylic acid esters in regard to their resistance to discoloration at high temperatures. For optimum resistance to wetting and attack by hydrophilic solvents, the interpolymers of the 2-alkenyl ethers of non-enic monohydric alcohols are preferred, although in many cases the interpolymers of the 2-alkenyl esters of non-enic monocarboxylic acids have proven nearly equivalent in this respect. Both the 2-alkenyl mono-ethers and the carboxylic mono-esters are likewise useful in endowing the resulting copolymers with improved flexibility, and this effect can be enhanced by the use of the 2-alkenyl ethers and esters of long chain alcohols and carboxylic acids respectively. The interpolymers of the 2-alkenyl mono-esters tend to cure to a solvent- and heat-resistant state more slowly and under more stringent conditions than do the interpolymers of the 2-alkenyl mono-ethers.

I have found that the presence of as little as 0.2 mole of the interpolymerizable mono-2-alkenyl compound (per mole of the poly-2-alkenyl ester) in the initial reactant mixture is sufficient to effect a marked increase in the conversion of the poly-2-alkenyl ester and copolymerizable monoolefinic compound to the soluble, interpolymeric form, and that the major proportion of these monomers is converted to soluble interpolymer when about 3.5-5 moles of the mono-2-alkenyl compound are initially present, and even higher conversions are attained as the amount of the latter is further increased, e. g., to 7-10 moles. Generally there is no particular advantage in using more than 15 moles of the additional mono-2-alkenyl compound.

Suitable poly-2-alkenyl esters (A) for use in my invention are derived from any polybasic acid and any of the 2-alkenyl alcohols, including allyl, 2-methallyl, 2-ethallyl, 2-chloroallyl, 2-hydroxymethyl) allyl, 2-(chloromethyl) allyl, tiglyl, crotyl, 4-chlorocrotyl, and cinnamyl alcohols, of which those containing a terminal methylene group are preferred, e. g., allyl and methallyl alcohols. Although such poly-2-alkenyl esters of a wide variety of polybasic acids are operable in my invention, they differ to a considerable degree in their relative reactivities as well as in the character of the resulting products. Thus, for example, the poly-2-alkenyl esters of olefinic polycarboxylic acids tend to interpolymerize more rapidly by my method than the corresponding poly-2-alkenyl esters of saturated polycarboxylic acids, and the resulting polymeric products are generally of higher molecular weight. In the former class, the poly-2-alkenyl esters of alpha-olefinic polycarboxylic acids are preferred, e. g., diallyl fumarate, diallyl maleate, dimethallyl itaconate, di-2-chloroallyl itaconate, diallyl mesaconate, dimethallyl citraconate, and triallyl aconitate. Of these, the di-2-alkenyl fumarates are particularly efficacious in view of their cheapness, their speed of reaction, the high yields of soluble interpolymers obtained therefrom, and the character of the solvent- and heat-resistant products resulting from the curing of the interpolymers. The di-2-alkenyl maleates yield interpolymers which tend to yellow somewhat upon aging. The di-2-alkenyl citraconates and tri-2-alkenyl aconitates are somewhat less reactive in my interpolymerization reactions, and the latter likewise yield a markedly softer type of resin.

The poly-2-alkenyl esters of the non-enic polycarboxylic acids are useful in my invention, however, particularly when the copolymerizable monoolefinic compound employed therewith is a derivative of an olefinic acid, e. g., an acrylic or fumaric ester. Exemplary of such poly-2-alkenyl esters are diallyl oxalate, diallyl malonate, diallyl alpha-methylmalonate, diallyl succinate, dimethallyl glutarate, di-2-chlorallyl adipate, diallyl sebacate, diallyl azelaate, dimethallyl suberate, diallyl phthalate and triallyl carballylate. In this class, the poly-2-alkenyl esters of the shorter-chain acids, e. g., diallyl oxalate and dimethallyl phthalate, tend to yield interpolymers capable of being cured to hard, solvent-resistant products, whereas more flexible products are obtained from the interpolymers of the poly-2-alkenyl esters of the longer chain acids, e. g., diallyl suberate.

Another useful class of poly-2-alkenyl esters are those derived from inorganic polybasic acids, e. g., diallyl carbonate and dimethallyl sulfate, and particularly those derived from the tri- and tetravalent inorganic acids, e. g., triallyl phosphate, tetraallyl silicate, tetramethallyl stannate and tetraallyl titanate. The latter group find use, according to my invention, in the preparation of the interpolymers which are useful as bases for baking enamels and other non-flammable plastic objects capable of withstanding high temperatures. Like the preceding class, these poly-2-alkenyl esters interpolymerize more readily and yield the most satisfactory products when the copolymerizable monoolefinic compound employed therewith is an olefinic acid derivative, e. g., maleimide, acrylamide, diethyl fumarate.

Of the wide variety of copolymerizable monoolefinic compounds (B) which are operable in my invention, a particularly suitable class are those of the formula $RR'C=CR''R'''$ in which the vinyl group is in every case linked to an exocyclic atom, and wherein R may be hydrogen, fluorine or methyl; R' may be hydrogen, fluorine, carboxyl, or a group hydrolyzable to carboxyl including carboalkoxy (e. g., carbomethoxy, carboethoxy and carbohexoxy), carboaryloxy (e. g., carbophenoxy and carbotolyloxy), carbaralkoxy (e. g., carbobenzyloxy), carbamyl, N-alkylcarbamyl (e. g., N-methylcarbamyl), N-arylcarbamyl (e. g., N-phenylcarbamyl), and carbonitrilo; R'' may be hydrogen, lower alkyl (e. g., methyl, ethyl), chlorine, fluorine, carboxyl, or a group hydrolyzable to carboxyl (as defined above); R''' may be hydrogen, methyl, chlorine, fluorine, carboxyl, a group hydrolyzable to carboxyl, alkoxy (e. g., methoxy, ethoxy, propoxy, isopropoxy, butoxy, amyloxy, hexoxy, heptoxy, octoxy, nonoxy and decoxy), aryloxy (e. g., phenoxy, tolyloxy, naphthoxy, p-chlorophenoxy, and p-methoxyphenoxy), aralkoxy (e. g., benzyloxy), acyloxy where the acyl group is devoid of olefinic and acetylenic unsaturation (e. g., acetoxy, propionoxy, butyroxy and benzoyloxy), acyl as previously defined (e. g., acetyl, propionyl, isobutyryl and benzoyl); and R''' may additionally be carboxyl or a group hydrolyzable to carboxyl when R'' is carboxyl or a related group; and R''' may together with R' comprise a dicarbanhydro group ($-CO-O-CO-$), or a dicarboimide group ($-CO-NR^\theta-CO-$), where $R^\theta$ is hydrogen, alkyl (e. g., methyl, ethyl, propyl, isopropyl, butyl, isobutyl, amyl, cyclopentyl, hexyl, cyclohexyl, heptyl, octyl, nonyl and decyl), aryl (e. g., phenyl, tolyl, xylyl, xenyl and naphthyl) or aralkyl (e. g., benzyl, beta-phenethyl).

Of the wide variety of such copolymerizable monoolefinic compounds which I may use in my invention, I prefer to employ the following because of the superior properties of the products, and because of the ease and convenience with which the copolymerization can be carried out, as well as for reasons of economy, etc.:

1. The propenoic esters of the non-olefinic monohydric alcohols, such as methyl acrylate, methyl methacrylate, butyl acrylate, butyl methacrylate, octyl acrylate, beta-chloroethyl acrylate, benzyl acrylate, phenyl acrylate, etc. Of these, the lower alkyl acrylates and methacrylates are especially preferred.

2. The alpha-olefinic polycarboxylic acid esters of the non-olefinic monohydric alcohols, such as diethyl fumarate, bis (beta-chloroethyl) fumarate, dibutyl fumarate, dibenzyl fumarate, benzyl ethyl fumarate, bis (2-ethylhexyl) fumarate, etc., dimethyl itaconate, diethyl itaconate, dihexyl itaconate, di-cyclohexyl itaconate, bis-(beta-phenylethyl) itaconate, dioctyl itaconate, bis-beta-chloroethyl itaconate, etc., as well as the corresponding esters of mesaconic, citraconic, and aconitic acids. Of these, the lower alkyl fumaric and itaconic esters are especially preferred.

3. The vinyl esters of the non-olefinic monocarboxylic acids, such as vinyl acetate, vinyl chloroacetate, vinyl butyrate, vinyl benzoate, vinyl phenylacetate, vinyl trichloroacetate, etc. Vinyl acetate, propionate and butyrate are especially preferred.

4. Isobutylene.

5. Vinyl chloride, especially when the third, interpolymerizable alkenyl compound is a 2-alkenyl chloride.

6. Vinylidene chloride, especially when the third, interpolymerizable alkenyl compound is a 2-alkenyl chloride.

Further examples of preferred monoolefinic compounds are acrylamide, N-methylacrylamide, acrylonitrile, methacrylonitrile, fumaronitrile, maleimide, N-butylmaleimide, vinyl n-butyl ether, vinyl hexyl ether, vinyl phenyl ether, and vinyl benzyl ether.

By the appropriate choice of copolymerizable monoolefinic compound, numerous variations in the properties of the resulting soluble, unsaturated interpolymers can be attained. Thus, for example, the interpolymerization of a poly-2-alkenyl ester and a 2-alkenyl compound with isobutylene yields resins of improved compatibility with cheap hydrocarbon solvents, an important factor in the formulation of commercial surface coatings. Copolymerization with halogenated monoolefinic compounds such as vinyl chloride or vinylidene chloride yields polymeric materials of increased flame-resistance and often of greater hardness. The latter property can also be enhanced by copolymerization with olefinic acid nitriles, amides and imides, e. g., acrylonitrile and methacrylamide. On the other hand, softer and more flexible products can usually be obtained by the copolymerization with olefinic acid esters of nonenic monohydric alcohols, such as the acrylates, methacrylates, maleates, fumarates, itaconates, mesaconates and aconitates, particularly such esters derived from alcohols containing a chain of two or more carbon atoms, e. g., ethanol, n-butanol, 2-ethylhexanol and octanol.

In the practice of my invention the poly-2-alkenyl ester (A) or mixture of such esters is heated at 25° to 120° C. with from 0.1 to 8.0, preferably 0.5–5.0, molar equivalents of a copolymerizable, monoolefinic compound (B),

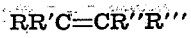

as defined above, or mixture of such compounds, and with from 0.2 to 15.0, preferably 0.2–10.0, molar equivalents of a mono-2-alkenyl compound (C) of the class defined.

The reaction times will vary depending upon the interpolymerizable reactants employed as well as on the relative proportions thereof, but times in the range of from 0.5 to 200 hours are usually sufficient, although longer times, e. g., 300–400 hours, may be employed where very high yields of the soluble interpolymers are desired.

My interpolymerization reaction is promoted by the presence of free radicals, including those obtained by the thermal decomposition of peroxides, e. g., organic peroxides such as acetyl peroxide, benzoyl peroxide, cumene hydroperoxide, and tertiary-butyl hydroperoxide. Such promoters are usually employed in amounts of from 0.1 to 20.0%, mainly from 0.1 to 5.0%, by weight of the reactant mixture and may be added either at the beginning, or incrementally throughout the reaction. The latter method is often preferable when the reaction time exceeds 36 hours' duration.

The course of the reaction can be followed by measuring the increasing viscosity of the reaction mixture, and the product can be isolated therefrom by precipitation through addition of a non-solvent, e. g., n-hexane or diethyl ether, or by removal of any unreacted starting materials by preferential extraction or distillation. Although it is unnecessary for most commercial applications, my interpolymers can be further purified, as for analytical purposes, by solution in a minimum volume of solvent and precipitation by dilution with an excess of n-hexane or diethyl ether.

My new interpolymers can be employed in the solid form as thermosetting molding powders for the preparation of various objects including rods, blocks and sheets. Alternatively they can be dissolved in appropriate solvents for use as coating, impregnating and laminating compositions. For such purposes, the crude interpolymerization reaction mixtures can themselves be employed by dilution with a suitable high-boiling solvent and subsequent removal of any unreacted 2-alkenyl compound, as by distillation. Alternatively my interpolymers can be dissolved in liquid, copolymerizable ethylenic compounds, e. g., phenyl acrylate, allyl methacrylate, diethyl fumarate, vinyl benzoate, to yield solutions which are capable of being totally polymerized and leaving no solvent to be evaporated. Such solutions are particularly useful in applications where evaporation of a solvent constitutes a technical or health hazard. They are likewise useful as fluid molding compositions capable of being cured with a minimum of shrinkage.

Application of heat at temperatures such as 60–200° C. to compositions containing my interpolymers, particularly in the presence of peroxidic catalysts, induces further polymerization whereby the products are converted to an insoluble and essentially infusible state. Suitable inert addends including dyes, pigments, fillers and plasticizers can be incorporated with my interpolymers, preferably at the soluble, fusible stage prior to final cure.

The following examples disclose my invention in more detail. All parts are by weight.

EXAMPLE 1

To illustrate my discovery of the effect of interpolymerizable mono - 2 - alkenyl compounds upon the copolymerization of poly-2-alkenyl esters with copolymerizable monoolefinic compounds, mixtures of these monomers in varying proportions are heated at 60° C. in the presence of benzoyl peroxide as polymerization promoter. In each case, the reaction is carried out until the point of incipient gelation is attained or until no further increase in the viscosity of the reaction mixture is detectable. The reaction mixtures are then diluted with a 50:50 mixture of diethyl ether and n-hexane, and the precipitated interpolymers are further purified by repeated solution in a minimum volume of acetone and precipitation with the ether-hexane mixture. The interpolymeric products are then dried in vacuo to constant weight.

In Table I following are summarized the amounts of the monomeric starting materials, peroxide, and interpolymeric products, and the reaction times. To emphasize the advantages of my invention, examples of copolymerization of poly-2-alkenyl esters with copolymerizable monoolefinic compounds in the absence of my additional mono-2-alkenyl compounds are likewise included (I–1, 7, 11, 15, 18, 24, 28, 32, 36, 38, 40, 44, 48, 51, 60, 69, 71, 74, 79, 81, 86, 89, 93, 98 and 103). In those examples in which the symbol "$\phi$" appears in the "Alkenyl Compounds" column, my additional mono-2-alkenyl compound has been entirely replaced by benzene in the amount indicated, to show that the effect of my additional interpolymerizable 2-alkenyl compound is not at all like that of a conventional non-polymerizable solvent in the copolymerization reaction mixture (I–11, 28, 36, 38, 44).

Table I

| | (A) Poly-2-Alkenyl Ester | | (B) Copolymerizable Monoolefinic Compound | | (C) 2-Alkenyl Compound | | Benzoyl Peroxide | Reaction Time (Hrs.) | Interpolymer |
|---|---|---|---|---|---|---|---|---|---|
| 1 | Diallyl Fumarate | 100 | Vinyl Acetate | 25.0 | | | 1.0 | 4.0 | 9.5 |
| 2 | do | 100 | do | 25.0 | 2,3-Dichloropropene | 100 | 6.0 | 41.0 | 94.0 |
| 3 | do | 100 | do | 25.0 | Methallyl Chloride | 100 | 6.0 | 24.9 | 90.0 |
| 4 | do | 100 | do | 25.0 | Methallyl Ethyl Ether | 100 | 4.0 | 5.25 | 50.0 |
| 5 | do | 100 | do | 25.0 | Allyl Acetate | 100 | 4.0 | 2.48 | 25.9 |
| 6 | do | 100 | do | 25.0 | Allyl Chloracetate | 100 | 6.0 | 37.25 | 99.0 |
| 7 | do | 100 | do | 43.8 | | | 0.50 | 3.0 | 7.4 |
| 8 | do | 100 | do | 43.8 | Allyl Alcohol | 9.6 | 0.50 | 15.3 | 24.2 |
| 9 | do | 100 | do | 43.8 | do | 39.4 | 2.06 | 7.7 | 46.2 |
| 10 | do | 100 | do | 43.8 | do | 138.0 | 4.12 | ²319.0 | 72.0 |
| 11 | do | 100 | do | 43.8 | (¹) | 138.0 | 1.24 | 6.5 | 25.2 |
| 12 | do | 100 | do | 43.8 | Allyl Alcohol | 335.0 | 8.23 | ²266.0 | 129.8 |
| 13 | do | 100 | do | 43.8 | Allyl Chloride | 100.0 | 4.0 | 5.0 | 50.5 |
| 14 | do | 100 | do | 43.8 | do | 138.0 | 4.8 | 5.8 | 65.5 |
| 15 | do | 100 | do | 64.0 | | | 1.8 | 2.8 | 21.0 |
| 16 | do | 100 | do | 64.0 | Allyl Chloride | 79.4 | 4.0 | 2.5 | 40.0 |
| 17 | do | 100 | do | 64.0 | do | 100.0 | 4.0 | 4.9 | 75.2 |
| 18 | do | 100 | Methyl Acrylate | 25.0 | | | 1.0 | 1.48 | 11.9 |
| 19 | do | 100 | do | 25.0 | Allyl Chloride | 100.0 | 4.0 | 4.5 | 44.0 |
| 20 | do | 100 | do | 25.0 | do | 334.0 | 6.0 | 38.2 | 133.5 |
| 21 | do | 100 | do | 25.0 | Allyl n-Butyl Ether | 100.0 | 4.0 | 4.0 | 42.3 |
| 22 | do | 100 | do | 25.0 | Allyl Acetate | 100.0 | 4.0 | 2.5 | 24.8 |
| 23 | do | 100 | do | 25.0 | Methallyl Acetate | 100.0 | 4.0 | 3.5 | 25.2 |
| 24 | do | 100 | do | 44.0 | | | 0.50 | 1.5 | 6.6 |
| 25 | do | 100 | do | 44.0 | Allyl Alcohol | 10.0 | 0.50 | 9.3 | 19.1 |
| 26 | do | 100 | do | 44.0 | do | 39.5 | 2.06 | 4.8 | 33.3 |
| 27 | do | 100 | do | 44.0 | do | 334.2 | 8.20 | ²286.0 | 180.0 |
| 28 | do | 100 | do | 44.0 | (¹) | 334.2 | 1.24 | 12.9 | 43.8 |
| 29 | do | 100 | do | 44.0 | Allyl Chloride | 334.0 | 6.0 | 17.2 | 132.0 |
| 30 | do | 100 | Methyl Methacrylate | 51.0 | Allyl Alcohol | 39.5 | 2.06 | 4.9 | 53.7 |
| 31 | do | 100 | do | 51.0 | do | 336.0 | 8.25 | ²339.0 | 177.0 |
| 32 | do | 100 | Diethyl Fumarate | 87.8 | | | 0.64 | 6.7 | 16.0 |
| 33 | do | 100 | do | 87.8 | Allyl Alcohol | 9.8 | 0.64 | 24.3 | 37.2 |
| 34 | do | 100 | do | 87.8 | do | 39.4 | 2.06 | 14.5 | 67.5 |
| 35 | do | 100 | do | 87.8 | do | 88.7 | 3.09 | 15.6 | 100.0 |
| 36 | do | 100 | do | 87.8 | (¹) | 88.7 | 1.24 | 11.6 | 30.2 |
| 37 | do | 100 | do | 87.8 | Allyl Alcohol | 136.0 | 4.10 | 19.1 | 142.0 |
| 38 | do | 100 | do | 87.8 | (¹) | 138.0 | 1.24 | 15.5 | 51.5 |
| 39 | do | 100 | do | 87.8 | Allyl Alcohol | 534.0 | 12.35 | ²339.0 | 195.0 |
| 40 | do | 100 | Dimethyl Itaconate | 79.4 | | | 4.86 | 9.5 | 57.8 |
| 41 | do | 100 | do | 80.6 | Allyl Alcohol | 14.8 | 3.08 | 19.7 | 100.0 |
| 42 | do | 100 | do | 80.6 | do | 39.4 | 2.05 | ²226.0 | 116.8 |
| 43 | do | 100 | do | 80.6 | do | 88.8 | 3.09 | ²358.0 | 128.0 |
| 44 | do | 100 | do | 80.6 | (¹) | 88.8 | 1.26 | 56.1 | 113.0 |
| 45 | do | 100 | do | 80.6 | Allyl Alcohol | 110.0 | 14.1 | 16.3 | 159.0 |
| 46 | do | 100 | do | 80.6 | do | 138.0 | 16.5 | 29.0 | 199.0 |
| 47 | do | 100 | do | 80.6 | do | 177.8 | 19.6 | 44.9 | 222.0 |
| 48 | do | 100 | Vinyl n-Butyl Ether | 25.0 | | | 1.0 | 2.9 | 30.0 |
| 49 | do | 100 | do | 25.0 | Methallyl Alcohol | 100.0 | 4.0 | 5.6 | 70.5 |
| 50 | do | 100 | do | 25.0 | do | 100.0 | 8.0 | 72.0 | 62.5 |
| 51 | do | 100 | Vinyl Chloride | 32.2 | | | 3.10 | 0.75 | 27.6 |
| 52 | do | 100 | do | 32.2 | Methallyl Chloride | 23.8 | 3.06 | 7.50 | 33.8 |
| 53 | do | 100 | do | 32.2 | do | 61.0 | 4.06 | 17.25 | 81.0 |
| 54 | do | 100 | do | 33.4 | do | 138.0 | 6.16 | 42.0 | 123.0 |
| 55 | do | 100 | do | 63.2 | do | 46.8 | 4.90 | 8.75 | 63.8 |
| 56 | do | 100 | do | 64.0 | do | 92.0 | 6.14 | 18.75 | 105.0 |
| 57 | do | 100 | do | 64.0 | do | 228.0 | 9.60 | ²272.75 | 187.0 |
| 58 | do | 100 | do | 64.0 | Allyl Chloride | 79.4 | 6.16 | 2.50 | 34.4 |
| 59 | do | 100 | do | 30.0 | do | 305.0 | 12.00 | 12.20 | 97.4 |
| 60 | do | 100 | Vinylidene Chloride | 50.0 | | | 4.06 | 1.0 | 24.8 |
| 61 | do | 100 | do | 50.0 | Methallyl Chloride | 23.4 | 3.06 | 11.5 | 46.8 |
| 62 | do | 100 | do | 50.0 | do | 140.0 | 6.16 | ²130.0 | 79.8 |
| 63 | do | 100 | do | 100.0 | do | 46.0 | 4.80 | 22.25 | 68.8 |
| 64 | do | 100 | do | 100.0 | do | 93.0 | 6.22 | 62.0 | 78.6 |
| 65 | do | 100 | do | 100.0 | do | 230.0 | 9.8 | ²348.0 | 155.4 |
| 66 | do | 100 | do | 50.0 | Allyl Chloride | 52.6 | 4.06 | 2.75 | 28.2 |
| 67 | do | 100 | do | 50.0 | do | 304.0 | 12.0 | 10.75 | 152.0 |
| 68 | do | 100 | do | 100.0 | do | 79.4 | 6.16 | 3.75 | 54.6 |
| 69 | Diallyl Maleate | 100 | Vinyl Acetate | 25.0 | | | 1.0 | 3.3 | 14.1 |
| 70 | do | 100 | do | 25.0 | Methallyl Chloride | 100.0 | 12.0 | ²84.0 | 52.2 |
| 71 | do | 100 | Vinyl n-Butyl Ether | 25.0 | | | 1.0 | 2.6 | 16.5 |
| 72 | do | 100 | do | 25.0 | Methallyl Alcohol | 100.0 | 12.0 | ²84.0 | 57.5 |
| 73 | do | 100 | do | 25.0 | Methallyl Acetate | 100.0 | 12.0 | 72.0 | 70.7 |

¹ Benzene substituted for the 2-alkenyl alcohol or derivative.
² No evidence of gelation.

Table I—Continued

| | (A) Poly-2-Alkenyl Ester | | (B) Copolymerizable Monoolefinic Compound | | (C) 2-Alkenyl Compound | | Benzoyl Peroxide | Reaction Time (Hrs.) | Inter- polymer |
|---|---|---|---|---|---|---|---|---|---|
| 74 | Diallyl Maleate | 100 | Diethyl Fumarate | 25.0 | | | 1.0 | 6.2 | 17.2 |
| 75 | do | 100 | do | 25.0 | Allyl Alcohol | 100.0 | 12.0 | ² 84.0 | 99.0 |
| 76 | do | 100 | do | 25.0 | do | 136.0 | 13.0 | ² 84.0 | 104.5 |
| 77 | do | 100 | do | 87.5 | do | 136.0 | 13.0 | ² 120.0 | 180.0 |
| 78 | do | 100 | do | 25.0 | Crotyl Alcohol | 100.0 | 12.0 | ² 84.0 | 52.0 |
| 79 | Diallyl Itaconate | 100 | Vinyl Acetate | 25.0 | | | 1.0 | 3.75 | 11.6 |
| 80 | do | 100 | do | 25.0 | Methallyl chloride | 100.0 | 12.0 | 74.9 | 88.5 |
| 81 | do | 100 | Vinyl n-Butyl Ether | 25.0 | | | 0.8 | 5.75 | 19.6 |
| 82 | do | 100 | do | 25.0 | Methallyl Alcohol | 100.0 | 8.0 | 41.5 | 92.0 |
| 83 | do | 100 | do | 25.0 | Methallyl Ethyl Ether | 100.0 | 4.0 | 7.5 | 54.5 |
| 84 | do | 100 | do | 25.0 | do | 200.0 | 5.0 | 33.0 | 100.0 |
| 85 | do | 100 | Diethyl Fumarate | 25.0 | Methallyl Alcohol | 100.0 | 8.0 | ² 72.0 | 98.5 |
| 86 | Triallyl Aconitate | 100 | Methyl Acrylate | 25.0 | | | 2.0 | 8.75 | 25.5 |
| 87 | do | 100 | do | 25.0 | Methallyl Chloride | 10.0 | 2.0 | 16.2 | 41.5 |
| 88 | do | 100 | do | 25.0 | do | 100.0 | 5.0 | ² 48.0 | 77.5 |
| 89 | Diallyl Adipate | 100 | do | 25.0 | | | 0.8 | 1.0 | 16.0 |
| 90 | do | 100 | do | 25.0 | Allyl Chloride | 100.0 | 8.0 | 42.75 | 99.0 |
| 91 | do | 100 | do | 25.0 | Allyl n-Butyl Ether | 100.0 | 8.0 | ² 72.0 | 77.5 |
| 92 | do | 100 | do | 25.0 | Allyl Acetate | 100.0 | 8.0 | ² 72.0 | 108.0 |
| 93 | do | 100 | Diethyl Fumarate | 25.0 | | | 2.0 | 5.5 | 17.0 |
| 94 | do | 100 | do | 25.0 | Allyl Alcohol | 100.0 | 13.5 | ² 76.5 | 35.6 |
| 95 | do | 100 | do | 25.0 | Methallyl Alcohol | 100.0 | 10.0 | ² 82.5 | 37.3 |
| 96 | do | 100 | do | 25.0 | Methallyl Ethyl Ether | 100.0 | 10.0 | ² 82.5 | 112.5 |
| 97 | do | 100 | do | 25.0 | Methallyl Acetate | 100.0 | 10.0 | 23.9 | 79.0 |
| 98 | Diallyl Phthalate | 100 | do | 25.0 | | | 0.8 | 24.75 | 15.1 |
| 99 | do | 100 | do | 25.0 | Methallyl Alcohol | 100.0 | 8.0 | ² 72.0 | 62.0 |
| 100 | do | 100 | do | 25.0 | Methallyl Chloride | 100.0 | 4.0 | ² 72.0 | 75.5 |
| 101 | do | 100 | do | 25.0 | Methallyl Ethyl Ether | 100.0 | 4.0 | 10.75 | 65.5 |
| 102 | do | 100 | do | 25.0 | Methallyl Acetate | 100.0 | 8.0 | ² 72.0 | 63.5 |
| 103 | do | 100 | Methyl Acrylate | 25.0 | | | 0.8 | 24.75 | 15.1 |
| 104 | do | 100 | do | 25.0 | Methallyl Alcohol | 100.0 | 8.0 | ² 72.0 | 69.0 |
| 105 | do | 100 | do | 25.0 | Methallyl Chloride | 100.0 | 8.0 | ² 72.0 | 83.8 |
| 106 | do | 100 | do | 25.0 | Methallyl Ethyl Ether | 100.0 | 4.0 | 10.75 | 73.0 |
| 107 | do | 100 | do | 25.0 | Methallyl Acetate | 100.0 | 8.0 | 72.0 | 70.5 |

² No evidence of gelation.

From the above table it is readily apparent that the presence of even a small amount of the interpolymerizable mono-2-alkenyl compound in the reaction mixture is sufficient to effect a marked increase in the amount of the poly-2-alkenyl ester and the copolymerizable monoolefinic compound converted to the soluble, interpolymeric form. This conversion increases as the amount of the mono-2-alkenyl compound in the reactant mixture is increased until the major proportion of both the poly-2-alkenyl ester and the copolymerizable monoolefinic compound can be converted to the soluble, interpolymeric form without danger of insolubilization.

EXAMPLE 2

A mixture of 39.2 parts of diallyl fumarate, 54.0 parts of allyl alcohol, 37.9 parts of vinyl trichloroacetate and 6.43 parts of benzoyl peroxide is heated at 60° C. for 6.5 hours. The reaction mixture is cooled and poured into n-hexane and the precipitated interpolymer is further purified by repeated solution in acetone and precipitation with hexane. After drying in vacuo to constant weight, 36 parts of polymeric solid are obtained.

*Analysis.*—Found: Cl, 7.34%; hydroxyl content, 3.93%; iodine number (Wijs), 117.0.

The chlorine content of the product arises from the presence of interpolymerized vinyl trichloroacetate, while the hydroxyl groups are derived from interpolymerized allyl alcohol. The iodine number indicates the residual unsaturation which has been introduced by the interpolymerized diallyl fumarate and which is available for further polymerization.

EXAMPLE 3

(a) Ninety-eight and two tenths parts of diallyl fumarate are admixed with 264.5 parts of allyl alcohol, 43.1 parts of vinyl acetate and 16.7 parts of a commercial 60% solution of tertiary-butyl hydrogen peroxide and heated at reflux for 22 hours after which the reaction mixture is cooled to room temperature.

(b) One-half of the crude reaction mixture is poured into n-hexane and the precipitated interpolymer is further purified by repeated solution in chloroform and precipitation with hexane. After drying to constant weight in vacuo, 63.2 parts of polymeric solid are obtained which corresponds to a total yield of 126.4 parts of the interpolymer from the entire reaction mixture.

*Analysis.*—Found: hydroxyl content, 6.14%; acetic acid, 3.8%; iodine number, 157.0; limiting viscosity $[n]^0$ in acetone, 0.051.

(c) The remainder of the crude reaction mixture from (a) above is admixed with 26.0 parts of diethyl fumarate and evacuated at 30° C. and 5 mm. pressure until distillation ceases. A solution of 1.78 parts of benzoyl peroxide in 10 parts of benzene is added and evacuation continued until the benzene is removed. The residual syrup is poured into a plate mold and cured by heating for 2.3 hours at 45° C., 13.2 hours at 90° C. and finally for 2.0 hours at 100° C. The resulting clear, colorless sheet is solvent-resistant and possesses a Rockwell hardness of L105.

EXAMPLE 4

(a) A mixture of 9.5 parts of isobutylene, 14.8 parts of diallyl fumarate, 14.7 parts of allyl alcohol and 0.3 part of benzoyl peroxide is heated in a sealed vessel for 82 hours at 80° C. The unreacted isobutylene is then evaporated at room temperature, and the syrupy reaction mixture is poured into n-hexane. The precipitated interpolymer is further purified by repeated solution in acetone and precipitation with n-hexane. After drying in vacuo to constant weight, 12.9 parts of polymeric solid are obtained.

*Analysis.*—Found: C, 63.97%; H, 7.21%; iodine number (Wijs), 104.6.

The analysis corresponds to a ternary interpolymer containing approximately 11.3% by weight (29.4 mole-percent) of isobutylene, 86.2% of diallyl fumarate and 2.5% of allyl alcohol. This represents a conversion of approximately 76% of the monomeric diallyl fumarate to the interpolymeric form. The iodine number indicates the large amount of residual unsaturation available in the interpolymer for further polymerization or copolymerization with reactive monomers.

(b) When the above copolymerization is repeated in the absence of the allyl alcohol, the reaction mixture gels to an insoluble mass before the copolymerization has proceeded for more than an hour. The copolymerization is again repeated in the absence of allyl alcohol but in more dilute solution by tripling the amount of isobutylene, i. e., by using 20.5 parts. However, little improvement is noticeable since gelation still occurs within approximately one hour.

(c) Six parts of the soluble, unsaturated ternary interpolymer of isobutylene, diallyl fumarate and allyl alcohol prepared in (a) above are dissolved in 4.0 parts of styrene together with 0.012 part of benzoyl peroxide and heated in a mold for 16 hours at 60° C. and then for 2 hours at 120° C. to yield a clear, colorless casting which is substantially infusible and insoluble, and has Rockwell hardness of L88, M63, and P51. When diethyl fumarate is substituted for styrene in the above, a clear, insoluble, heat-resistant casting is secured which has Rockwell hardness of L112, M110, and P107.

EXAMPLE 5

A mixture of 48.2 parts of bis-(beta-chloroethyl) fumarate, 39.2 parts of diallyl fumarate, 54.0 parts of allyl alcohol and 2.98 parts of benzoyl peroxide is heated at 60° C. for 6 hours. The reaction mixture is cooled and poured into hexane and the precipitated interpolymer is further purified by repeated solution in acetone and precipitation with hexane.

After drying in vacuo to constant weight, 72 parts of polymeric solid are obtained.

*Analysis.*—Found: Cl, 13.44%; hydroxyl content, 3.97%; iodine number (Wijs), 73.2.

The chlorine content of the product arises from the presence of interpolymerized bis(beta-chloroethyl) fumarate, while the hydroxyl groups present are derived from the interpolymerized allyl alcohol. The iodine number indicates the unsaturation present which resides in the interpolymerized diallyl fumarate.

Upon heating a sample of the interpolymer at elevated temperatures, it is converted to an insoluble, infusible product.

EXAMPLE 6

(a) A mixture of 117.8 parts of diallyl fumarate, 368.0 parts of methallyl alcohol, 51.7 parts of diethyl fumarate and 9.3 parts of a 60% solution of tertiary-butyl hydrogen peroxide is heated at reflux for 20 hours.

(b) One-half of the crude reaction mixture is purified as in previous examples and 103 parts of polymeric solid are obtained corresponding to a total yield of 206 parts of the interpolymer from the entire reaction mixture.

*Analysis.*—Found: hydroxyl content, 2.74%; iodine number, 88.9.

Seven parts of the interpolymer are dissolved in 3 parts of diallyl adipate together with 0.5 parts of benzoyl peroxide, and the mixture is cured in a cylindrical mold by heating for 19 hours at 60° C. and then for 2 hours at 90° C. to give a clear, hard, solvent-resistant plug.

(c) The remainder of the crude copolymerization reaction mixture from (a) above is admixed with 56.4 parts of diethyl fumarate and evacuated at 30° C. and 5 mm. until distillation ceases. A solution of 3.94 parts of benzoyl peroxide in 23.4 parts of benzene is then added and evacuation continued until the benzene is removed. The residual syrup is poured into a plate mold and cured by heating for 16.3 hours at 60° C. and then for 2.4 hours at 90° C. The resulting clear, colorless and solvent-resistant sheet has Rockwell hardnesses of L101 and M81.

EXAMPLE 7

Twenty-five and five tenths parts of bis-beta-chloroethyl itaconate are mixed with 19.6 parts of diallyl fumarate, 18.0 parts of allyl alcohol and 2.423 parts of benzoyl peroxide and the mixture is heated at 60° C. for 5 hours. The reaction mixture is cooled, poured into n-hexane, and the precipitated interpolymer is further purified by repeated solution in acetone and precipitation with hexane. After drying in vacuo to constant weight, 25.7 parts of polymeric solid are obtained.

*Analysis.* Found: chlorine, 13.39%; iodine number (Wijs), 67.5; hydroxyl content, 2.05%.

The chlorine content of the interpolymer indicates the presence of interpolymerized bis-beta-chloroethyl itaconate. The hydroxyl content arises from the presence of interpolymerized allyl alcohol, and the iodine number reveals the residual unsaturation in the interpolymer which is derived from the interpolymerized diallyl fumarate and which is available for further polymerization.

EXAMPLE 8

(a) A mixture of 78.5 parts of diallyl fumarate, 197.2 parts of methallyl alcohol, 31.0 parts of dimethyl itaconate, and 12.4 parts of a 60% solution of tertiary-butyl hydrogen peroxide is heated at approximately 110° C. for 24 hours. One-half of the reaction mixture is subjected to the same isolation and purification procedure as in previous examples and yields 62.5 parts of polymeric solid which corresponds to a total of 125 parts from the entire reaction mixture.

*Analysis.*—Found: hydroxyl content, 2.77%; iodine number, 93.2.

(b) Five parts of the interpolymer are dissolved in a mixture of 4 parts of xylene, 1 part of n-butanol, and 0.1 part of cyclohexanone, and after the solution is flowed out into a glass panel, it is cured by baking for 1 hour at 100° C. to yield a clear, colorless film which is insoluble in acetone.

(c) Seven parts of the interpolymer are dissolved in 3.0 parts of n-butyl acrylate together with 0.07 part of benzoyl peroxide and cured by heating in a coverless mold at 90° C. After heating for 18 minutes in the presence of air, the resulting casting is tack-free and resistant to attack by organic solvents. Moreover, it is not discolored even after being heated for 25 hours at 90° C.

(d) The remaining half of the original crude copolymerization reaction mixture prepared in (a) above, is admixed with 29.2 parts of diethyl fumarate and evacuated at room temperature and 5 mm. pressure to a thick syrup. A solution of 1.285 parts of benzoyl peroxide in 15 parts of benzene is then added and evacuation continued until distillation ceases. The residual syrup is poured into a plate mold and cured by heating for 16 hours at 60° C. and for 2 additional hours at 90° C. The resulting clear, colorless sheet possesses good dimensional stability and solvent resistance and has Rockwell hardnesses of L94, M73, and P58.

EXAMPLE 9

A mixture of 9.81 parts of diallyl fumarate, 15.90 parts of allyl alcohol, 6.73 parts of beta-chloroethyl acrylate and 0.888 part of benzoyl peroxide is heated for 3.5 hours at 60° C. The reaction mixture is cooled and poured into hexane after which the precipitated interpolymer is further purified by repeated solution in acetone and precipitation with hexane. Upon drying in vacuo to constant weight, 10.4 parts of polymeric solid are obtained.

*Analysis.*—Found: Cl. 8.99%; hydroxyl content, 3.43%; iodine number (Wijs), 82.6.

The chlorine content of the product arises from the presence of interpolymerized beta-chloroethyl acrylate, while the hydroxyl groups present are derived from the interpolymerized allyl alcohol. The iodine number indicates the unsaturation present which resides in the interpolymerized diallyl fumarate.

Upon heating a sample of the interpolymer at elevated temperatures, it is converted to an insoluble, infusible product.

EXAMPLE 10

(a) Seventy-eight and five tenths parts of diallyl fumarate are dissolved in a mixture of 34.4 parts of methyl acrylate and 418.0 parts of allyl alcohol. Six and twenty-one hundredths parts of a 60% solution of tertiary-butyl hydrogen peroxide are added and the mixture is heated at approximately 97° C. for 5 hours after which the interpolymerization reaction mixture is cooled.

(b) One half of the reaction mixture is purified as in preceding examples and yields 62.0 parts of polymeric solid corresponding to a total of 124.0 parts from the entire reaction mixture.

*Analysis.*—Found: iodine number, 133.8.

Upon heating a sample of the interpolymer at elevated temperatures, it is converted to an insoluble, infusible mass.

Fourteen parts of interpolymer 10-b are dissolved in 6 parts of n-butyl acrylate together with 0.14 part of benzoyl peroxide and the mixture is cured in a mold by heating at 60° C. for 46.6 hours. The resulting casting is colorless and solvent-resistant.

(c) The remainder of the crude interpolymerization reaction mixture from 10-a above is admixed with 27.8 parts of diethyl fumarate and evacuated as in previous examples. Upon heating with 1.6 parts of benzoyl peroxide in a plate mold for 15.4 hours at 60° C. and then for 2.0 hours at 90° C., a clear, colorless sheet is obtained which has a Rockwell hardness of M74.

EXAMPLE 11

A mixture of 30.0 parts of vinyl chloride, 23.5 parts of diallyl fumarate, 36.2 parts of methallyl chloride and 1.21 parts of benzoyl peroxide is heated at 60° C. for 24.25 hours. The reaction mixture is cooled and poured into n-hexane after which the precipitated interpolymer is further purified by repeated solution in acetone and precipitation with n-hexane. Upon drying the product in vacuo to constant weight, 31.2 parts of polymeric solid are obtained which is soluble in acetone, chloroform and benzene.

*Analysis.*—Found: C, 53.72%; H, 6.31%; Cl, 24.0%; iodine number, 110.8.

The analysis corresponds to a ternary interpolymer containing approximately 49.1% by weight of diallyl fumarate, 27.9% of methallyl chloride and 23.0% of vinyl chloride. The iodine number indicates the large amount of residual unsaturation in the interpolymer which is available for further polymerization.

Upon heating a sample of the interpolymer at elevated temperatures, it is shortly converted to an insoluble mass.

EXAMPLE 12

A mixture of 12.5 parts of vinyl chloride, 19.6 parts of diallyl fumarate, 45.3 parts of methallyl chloride and 3.9 parts of benzoyl peroxide is heated at 60° C. for 79 hours. The reaction mixture is cooled and evacuated at room temperature and 5 mm. pressure to a viscous syrup. The latter is poured into n-hexane and the precipitated interpolymer is purified by repeated solution in acetone and precipitation with n-hexane. After drying in vacuo to constant weight, 42 parts of polymeric solid are obtained.

(a) Three and five tenths parts of the interpolymer are dissolved in 1.5 parts of diethyl fumarate, together with 0.03 part of benzoyl peroxide, and the mixture is cured in a cylindrical mold by heating for 90 hours at 60° C. The resulting colorless transparent plug is solvent-resistant and has a Rockwell hardness of L54.

(b) When Example 12-a is repeated with diallyl fumarate substituted for diethyl fumarate, the resulting colorless product has a hardness of L106.

EXAMPLE 13

A mixture of 12.5 parts of vinyl chloride, 39.2 parts of diallyl fumarate, 44.4 parts of 2-chloroallyl chloride (1,2-dicholorpropene-2), and 1.94 parts of benzoyl peroxide is heated at 60° C. for 29.5 hours, and after isolating and purifying the reaction product as in Example 3 above, 42.5 parts of white polymeric solid are obtained which is soluble in acetone, chloroform, ethyl acetate, benzene and xylene.

(a) Ten parts of the interpolymer are dissolved in 4.5 parts of diethyl fumarate together with 0.09 part of benzoyl peroxide. The mixture is poured into a mold and cured by heating for 15 hours at 60° C., followed by 3 hours at 90° C., and finally for 2 hours at 120° C. The resulting transparent product is solvent-resistant and has a Rockwell hardness of L70. It undergoes no appreciable distortion at 120° C. and is completely non-flammable, i. e., it will not support combustion.

EXAMPLE 14

A mixture of 19.4 parts of vinylidene chloride, 19.6 parts of diallyl fumarate, 45.3 parts of methallyl chloride and 3.9 parts of benzoyl peroxide is heated in a sealed vessel at 60° C. for 169 hours. The clear, somewhat viscous reaction mixture is poured into n-hexane and the precipitated interpolymer is further purified by solution in acetone and precipitation with gasoline. After drying in vacuo to constant weight, 44.8 parts of polymeric solid are obtained.

*Analysis.*—Found: C, 48.5%; H, 5.50%; Cl, 33.60%; iodine number, 67.7.

The analysis corresponds to a ternary interpolymer containing approximately 38.4% by weight of diallyl fumarate, 27.5% of vinylidene chloride and 35.4% of methallyl chloride. This corresponds to a conversion of approximately 88% of the monomeric diallyl fumarate to the interpolymeric form. The iodine number indicates the amount of residual unsaturation in the interpolymer which is available for further polymerization.

(a) Three and five-tenths parts of the interpolymer are dissolved in 1.5 parts of diethyl fumarate together with 0.03 part of benzoyl peroxide and the solution is cured by heating in a mold for 48 hours at 60° C. and then 1 hour at 120° C. The resulting product is substantially insoluble and infusible.

(b) Example 14-a is repeated using monomeric diallyl fumarate in place of diethyl fumarate. The molded product has a Rockwell hardness of L105 and is insoluble in acetone, chloroform and benzene.

EXAMPLE 15

Nineteen and four-tenths parts of vinylidene chloride, 39.2 parts of diallyl fumarate, 44.4 parts of 2-chloroallyl chloride (2,3-dichloropropene) and 1.936 parts of benzoyl peroxide are mixed and heated at 60° C. for 40 hours. The reaction product is isolated and purified as in Example 2 and amounts to 52.3 parts of white polymeric solid which is soluble in acetone, chloroform, ethyl acetate, benzene and xylene. Upon heating a sample of the interpolymer at elevated temperatures it shortly becomes converted to an insoluble, infusible state. This product will not support combustion.

(a) Ten parts of the soluble interpolymer are dissolved in 4.5 parts of n-butyl acrylate together with 0.09 part of benzoyl peroxide, and the mixture is cured in a cylindrical mold by heating at 60° C. for 15 hours, and then for 3 hours at 90° C. The resulting transparent plug is unattacked by common solvents, it is self-extinguishing (i. e., it will not support combustion), and it has a Rockwell hardness of L50.

(b) When Example 15-a is repeated with the substitution of diethyl fumarate for the n-butyl acrylate, a solvent- and flame-resistant product is obtained having a Rockwell hardness of L81.

EXAMPLE 16

A mixture of 14.6 parts of vinylidene chloride, 29.4 parts of diallyl fumarate, 87.5 parts of a mixture of isomeric dichlorobutenes believed to consist chiefly of 2-chloromethallyl chloride, and 2.42 parts of benzoyl peroxide is heated at 80° C. for 100 hours. After the usual isolation and purification, 48.3 parts of solid interpolymer are obtained.

Ten parts of the interpolymer are dissolved in 4.5 parts of diethyl fumarate together with 0.09 part of benzoyl peroxide. The mixture is cured by heating in a mold for 15 hours at 60° C. and then for 3 hours at 90° C. to yield an insoluble casting. This casting does not support combustion.

Having thus described my invention, what I claim and desire to protect by Letters Patent is:

1. A soluble, unsaturated, ternary interpolymer derived from a monomeric mix containing, as the sole monomers, one molar equivalent of diallyl fumarate, from 0.1 to 8 molar equivalents of vinylidene chloride and from 0.2 to 15 molar equivalents of a 2-alkenyl chloride selected from the group consisting of allyl chloride and methallyl chloride.

2. The method of preparing a soluble, unsaturated, ternary interpolymer from a monomeric mixture of one molar equivalent of diallyl fumarate and from 0.1 to 8 molar equivalents of vinylidene chloride, which comprises carrying out the said interpolymerization in the presence of from 0.2 to 15 molar equivalents of a 2-alkenyl chloride selected from the group consisting of allyl chloride and methallyl chloride, the said monomers being the sole monomers present.

PLINY O. TAWNEY.

REFERENCES CITED

The following references are of record in the file of this patent:

UNITED STATES PATENTS

| Number | Name | Date |
|---|---|---|
| 2,160,940 | Britton et al. | June 6, 1939 |
| 2,378,195 | D'Alelio | June 12, 1945 |
| 2,378,197 | D'Alelio | June 12, 1945 |
| 2,431,374 | D'Alelio | Nov. 25, 1947 |
| 2,504,052 | Snyder | Apr. 11, 1950 |